(12) United States Patent
Geiser et al.

(10) Patent No.: US 10,337,569 B2
(45) Date of Patent: Jul. 2, 2019

(54) SWITCHABLE ONE-WAY CLUTCH

(71) Applicant: Schaeffler Technologies AG & Co. KG, Herzogenaurach (DE)

(72) Inventors: Jordan Geiser, Dalton, OH (US); Michael Hodge, Creston, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 57 days.

(21) Appl. No.: 15/867,391

(22) Filed: Jan. 10, 2018

(65) Prior Publication Data

US 2018/0216676 A1 Aug. 2, 2018

Related U.S. Application Data

(60) Provisional application No. 62/452,475, filed on Jan. 31, 2017.

(51) Int. Cl.
*F16D 41/08* (2006.01)
*F16D 27/112* (2006.01)
*F16D 41/067* (2006.01)
*F16D 27/00* (2006.01)

(52) U.S. Cl.
CPC ........... *F16D 41/088* (2013.01); *F16D 27/00* (2013.01); *F16D 27/112* (2013.01); *F16D 41/067* (2013.01)

(58) Field of Classification Search
None
See application file for complete search history.

(56) References Cited

U.S. PATENT DOCUMENTS

| 5,971,123 | A | 10/1999 | Ochab et al. |
| 6,082,480 | A * | 7/2000 | Itoh ................... B60K 23/08 180/247 |
| 6,622,837 | B2 | 9/2003 | Ochab et al. |
| 6,629,590 | B2 | 10/2003 | Ochab et al. |
| 6,722,484 | B2 | 4/2004 | Ochab et al. |
| 8,312,792 | B1 * | 11/2012 | Kochidomari .......... F16D 27/10 411/113 |
| 8,840,514 | B1 | 9/2014 | Knickerbocker et al. |
| 8,857,294 | B2 | 10/2014 | Brewer et al. |
| 8,857,589 | B2 | 10/2014 | Heath et al. |

(Continued)

FOREIGN PATENT DOCUMENTS

| WO | 2002/40891 | A2 | 5/2002 |
| WO | 2004/031597 | A1 | 4/2004 |

(Continued)

*Primary Examiner* — Timothy Hannon
(74) *Attorney, Agent, or Firm* — Reid A. Baldwin

(57) ABSTRACT

A switchable clutch includes an outer ring, an inner ring, a roller cage, a plurality of rollers, and a drag plate. The outer ring includes a plurality of ramped surfaces. The roller cage is disposed radially between the outer ring and the inner ring. The rollers are guided by the roller cage. The drag plate is rotationally fixed to the inner ring and is engageable with the roller cage to rotate the rollers relative to the outer ring. In an example embodiment, the switchable clutch has a spring engaged with the outer ring for urging the roller cage in a first rotational direction relative to the outer ring. In an example embodiment, the switchable clutch has an electromagnet for engaging the drag plate and the roller cage and/or a coil spring assembly for disengaging the drag plate and the roller cage.

11 Claims, 15 Drawing Sheets

(56) References Cited

U.S. PATENT DOCUMENTS

| | | |
|---|---|---|
| 8,919,513 B2 | 12/2014 | Heath et al. |
| 9,022,195 B2 | 5/2015 | Heath et al. |
| 9,360,059 B2 | 6/2016 | Palmer et al. |
| 2002/0125095 A1 | 9/2002 | Ochab et al. |
| 2002/0125097 A1 | 9/2002 | Ochab et al. |
| 2002/0134634 A1* | 9/2002 | Ito .................. B60K 6/387 192/35 |
| 2003/0089570 A1 | 5/2003 | Ochab et al. |
| 2003/0226415 A1* | 12/2003 | Baker ................ F16D 41/067 74/333 |
| 2004/0110594 A1* | 6/2004 | Goto ................. F16D 41/088 475/150 |
| 2004/0112701 A1* | 6/2004 | Baker .................. B60K 6/383 192/44 |
| 2004/0182670 A1* | 9/2004 | Nojiri ................ F16D 27/10 192/38 |
| 2006/0090977 A1* | 5/2006 | Goto ................. F16D 27/102 192/35 |
| 2007/0170029 A1* | 7/2007 | Okada ................ F16D 27/112 192/35 |
| 2010/0140041 A1* | 6/2010 | Wittkopp ............. F16D 25/00 192/66.32 |
| 2010/0314213 A1* | 12/2010 | Joki ................... F16D 27/01 192/82 R |
| 2012/0152686 A1 | 6/2012 | Brewer et al. |
| 2013/0112520 A1 | 5/2013 | Heath et al. |
| 2013/0134006 A1 | 5/2013 | Heath et al. |
| 2013/0199886 A1 | 8/2013 | Heath et al. |
| 2014/0274530 A1 | 9/2014 | Knickerbocker et al. |
| 2014/0326565 A1* | 11/2014 | Iwano ................ F16D 41/105 192/43 |
| 2015/0159743 A1 | 6/2015 | Palmer et al. |

FOREIGN PATENT DOCUMENTS

| | | |
|---|---|---|
| WO | 2013/082168 A1 | 6/2013 |
| WO | 2014/143090 A1 | 9/2014 |
| WO | 2014/159651 A1 | 10/2014 |

* cited by examiner

SWITCHABLE ONE-WAY CLUTCH

FIELD OF THE INVENTION

The invention relates generally to a one-way clutch, and more specifically to a switchable one-way clutch.

BACKGROUND OF THE INVENTION

Switchable one-way clutches are known. One example is shown in U.S. Pat. No. 8,857,294 entitled "ENGAGEMENT CONTROL ASSEMBLY FOR A BI-DIRECTIONAL OVERRUNNING CLUTCH" to Brewer et al.

BRIEF SUMMARY OF THE INVENTION

Example aspects broadly comprise a switchable clutch including an outer ring, an inner ring, a roller cage, a plurality of rollers, and a drag plate. The outer ring includes a plurality of ramped surfaces. The roller cage is disposed radially between the outer ring and the inner ring. The rollers are guided by the roller cage. The drag plate is rotationally fixed to the inner ring and is engageable with the roller cage to rotate the rollers relative to the outer ring. In an example embodiment, the switchable clutch has a spring engaged with the outer ring for urging the roller cage in a first rotational direction relative to the outer ring. In an example embodiment, the switchable clutch has an electromagnet for engaging the drag plate and the roller cage and/or a coil spring assembly for disengaging the drag plate and the roller cage.

In an example embodiment, the drag plate includes a friction material ring for engaging with the roller cage. In an example embodiment, the inner ring includes axial protrusions and the drag plate includes apertures for receiving the inner ring axial protrusions. In some example embodiments, the switchable clutch has a control plate rotationally fixed to the roller cage and contactable with the drag plate. In an example embodiment, the switchable clutch has a spring engaged with the outer ring and the control plate for urging the roller cage in a first rotational direction relative to the outer ring. In an example embodiment, the switchable clutch has biasing springs for positioning the rollers in the roller cage.

Other example aspects broadly comprise a switchable clutch including an outer ring, an inner ring, and a plurality of rollers. For a first mode of the switchable clutch, the outer ring and the inner ring are rotationally locked only in a first rotational direction. For a second mode of the switchable clutch, the outer ring and the inner ring are rotationally locked in the first rotational direction and a second rotational direction, opposite the first rotational direction. In an example embodiment, the switchable clutch has an electromagnet for engaging the second mode of the switchable clutch. In an example embodiment, the switchable clutch has a roller cage for positioning the plurality of rollers, a control plate rotationally fixed relative to the roller cage, and a drag plate for rotating the roller cage with the inner ring in the second mode of the switchable clutch.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
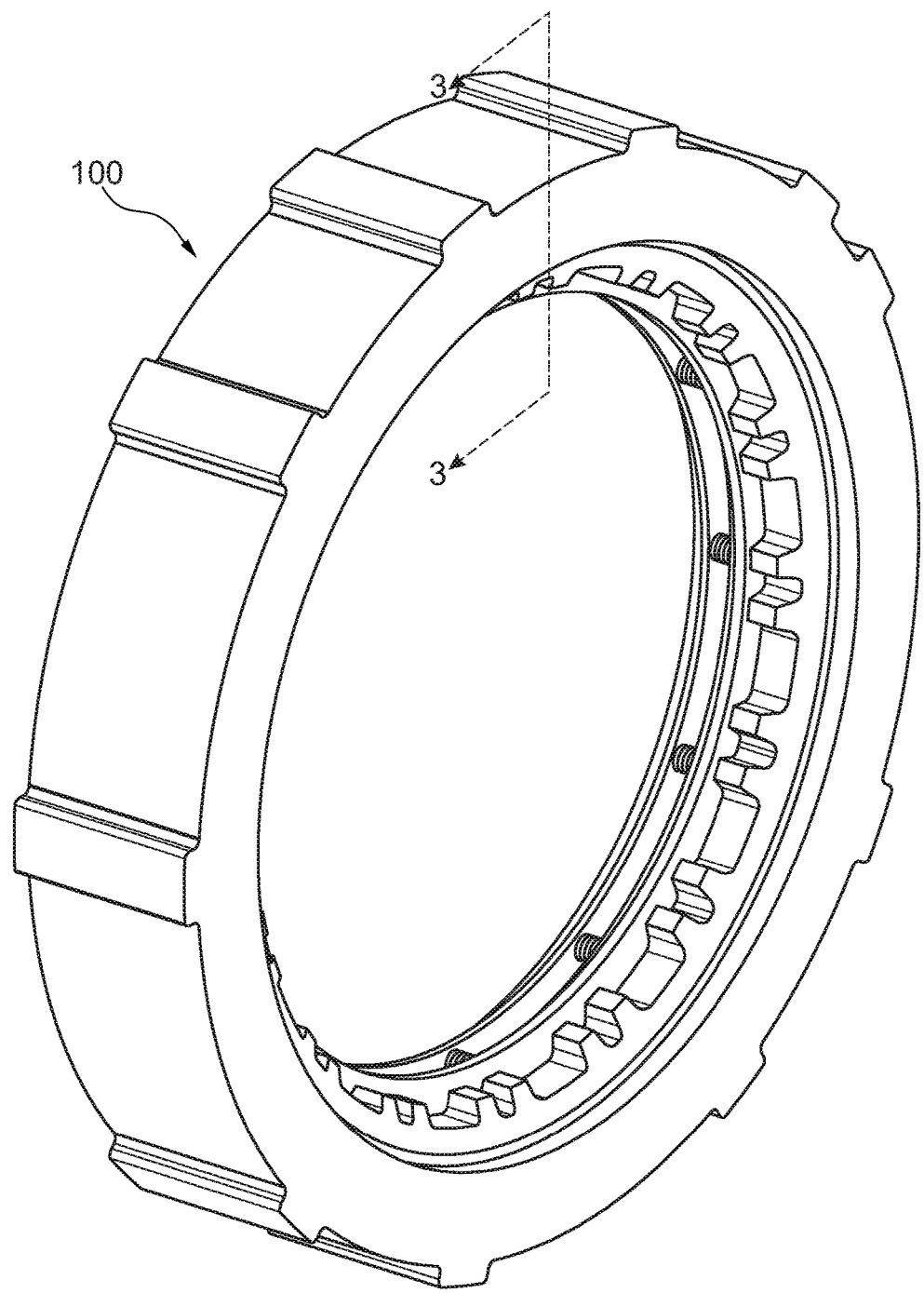
FIG. 1 is a front perspective view of a switchable one-way clutch according to an example aspect.
Figure 2:
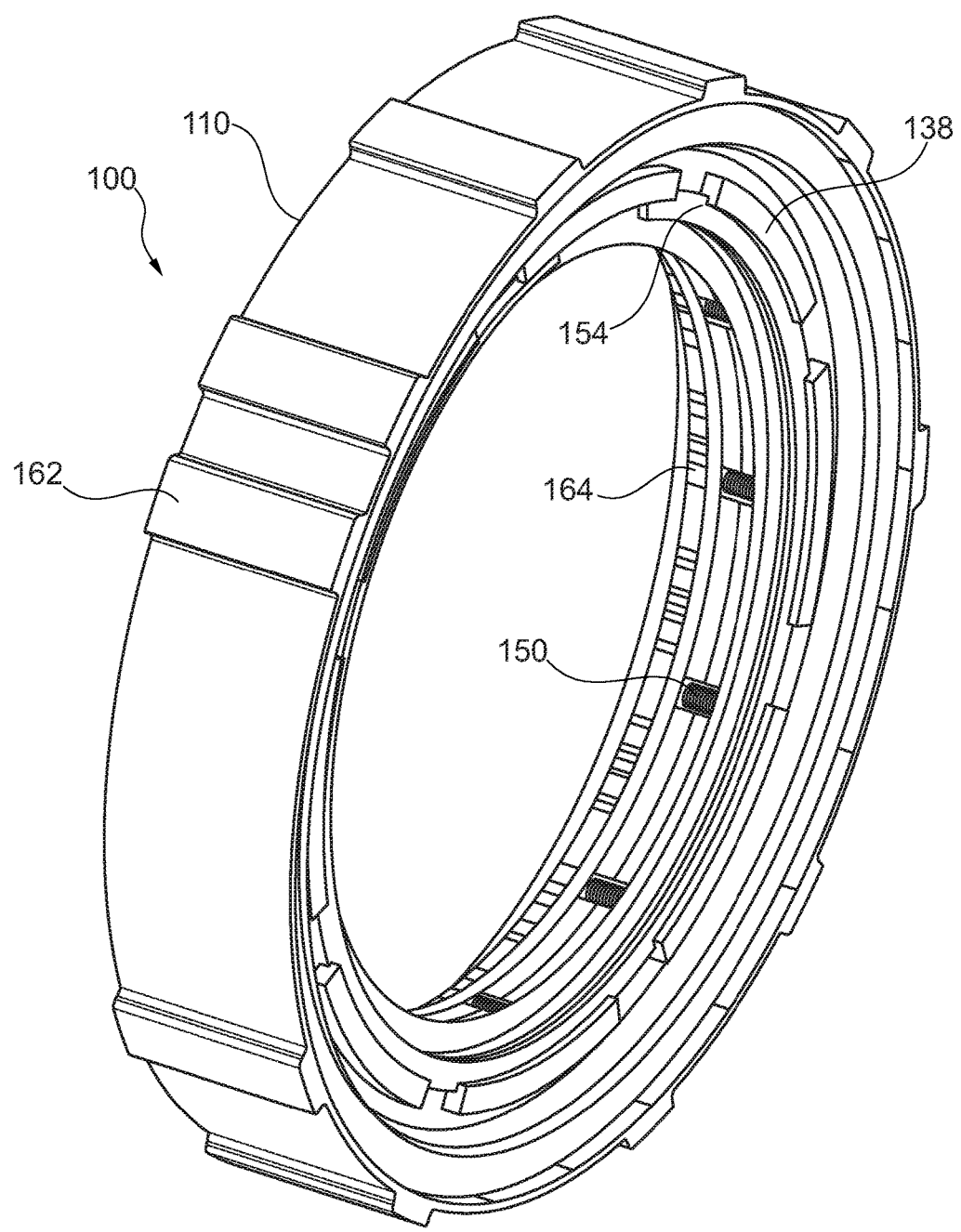
FIG. 2 is a back perspective view of the switchable one-way clutch of FIG. 1.
Figure 3:
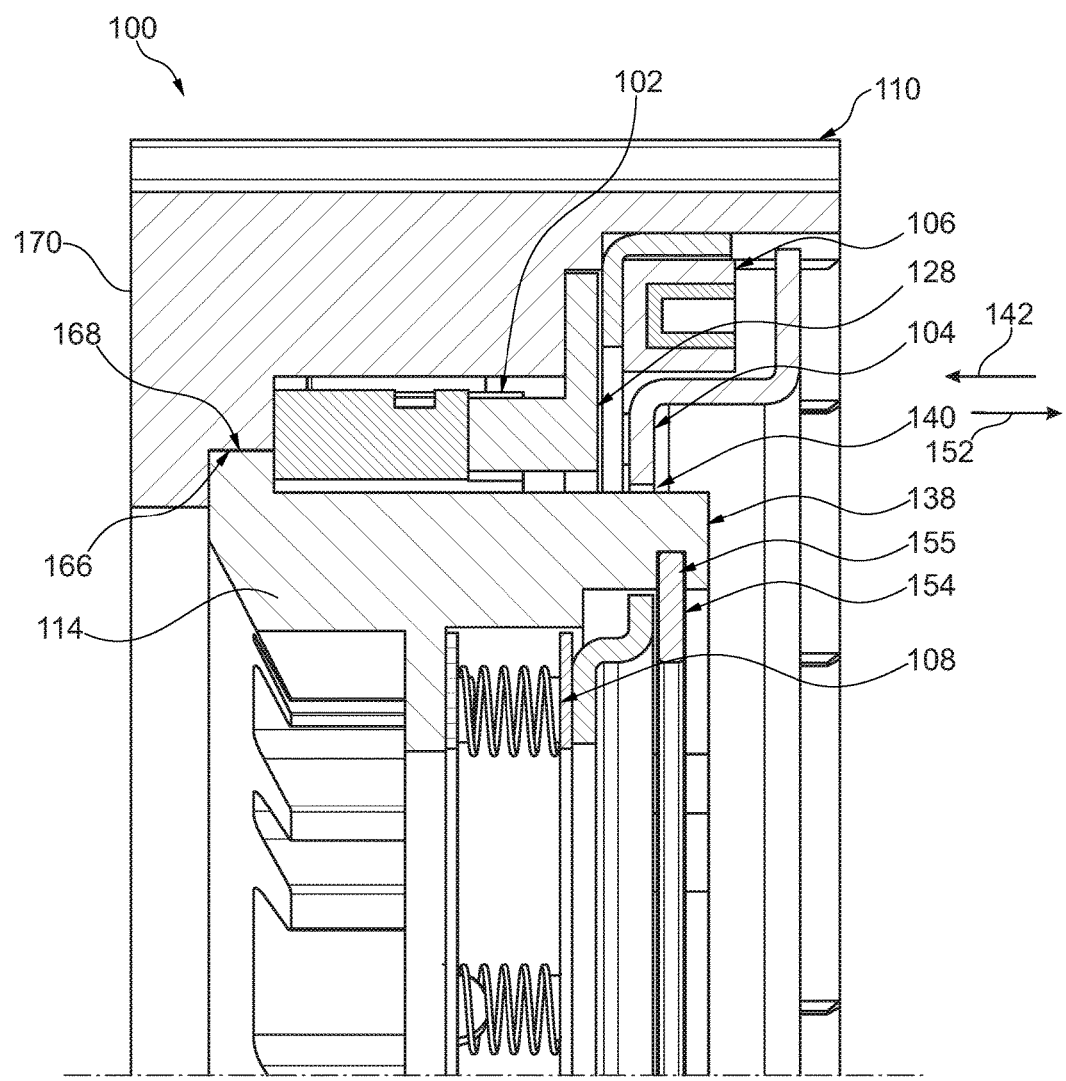
FIG. 3 is a partial cross-section view of the switchable one-way clutch of FIG. 1 taken generally along line 3-3 in FIG. 1.
Figure 4:
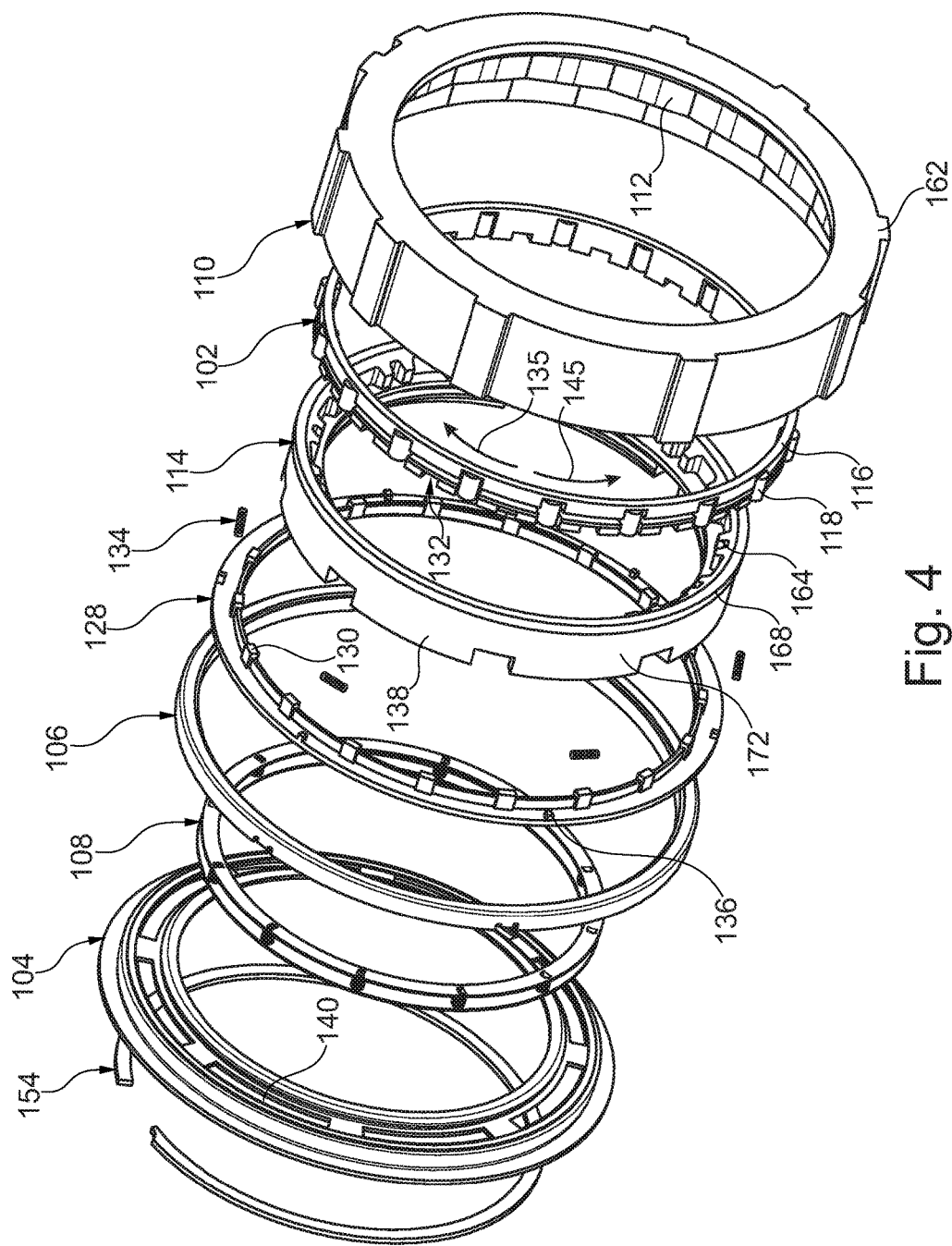
FIG. 4 is a front perspective exploded view of the switchable one-way clutch of FIG. 1.
Figure 5:
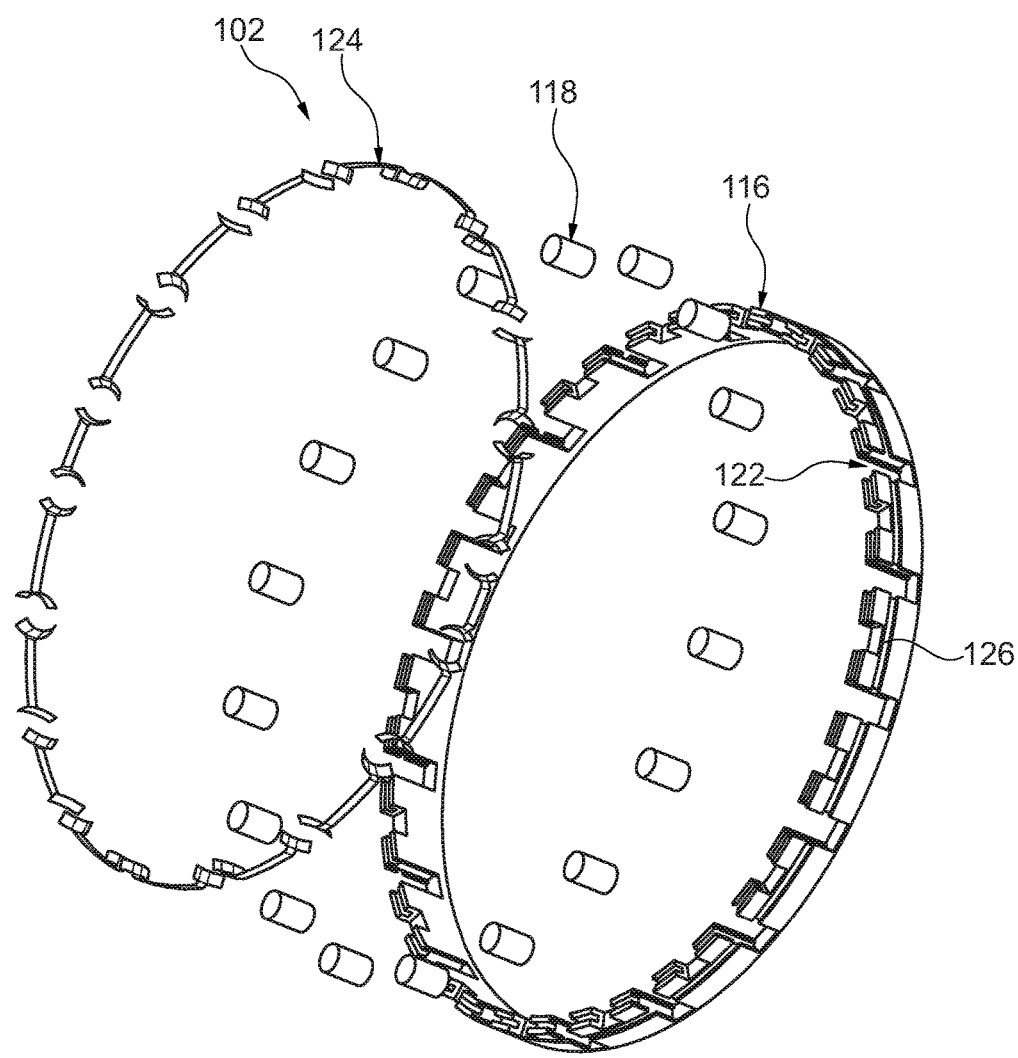
FIG. 5 is a back perspective exploded view of a cage and roller assembly of the clutch of FIG. 1.
Figure 6:
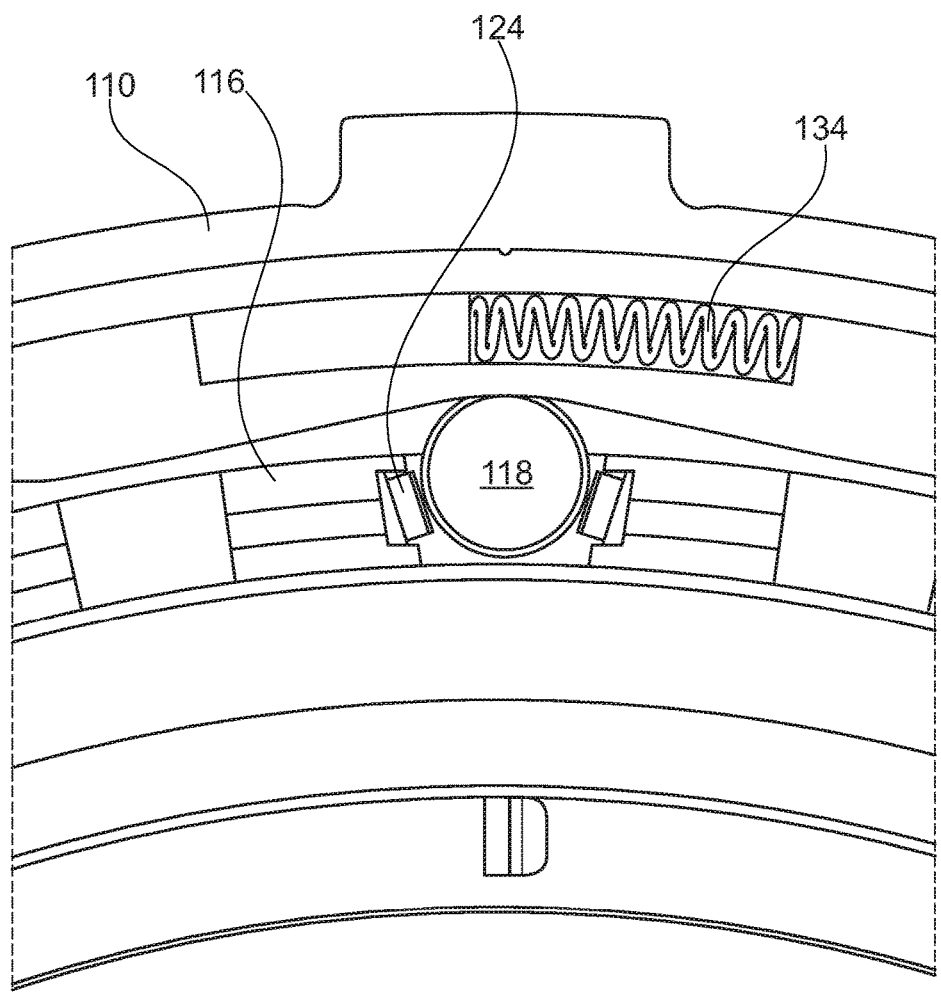
FIG. 6 is a back detail view of a roller and arc spring of the clutch of FIG. 1 with some components removed for clarity.
Figure 7:
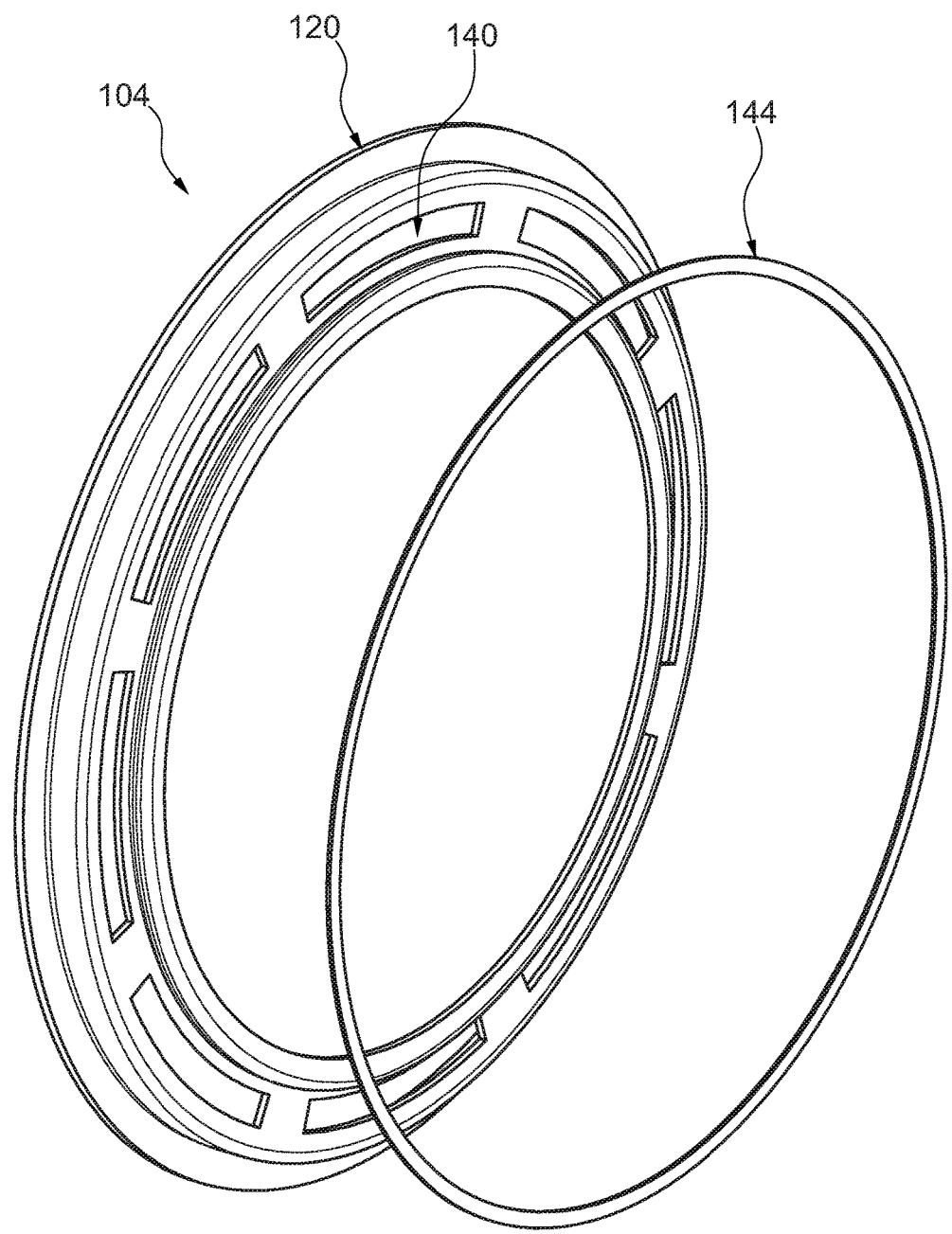
FIG. 7 is a front perspective exploded view of a drag plate assembly of the clutch of FIG. 1.
Figure 8:
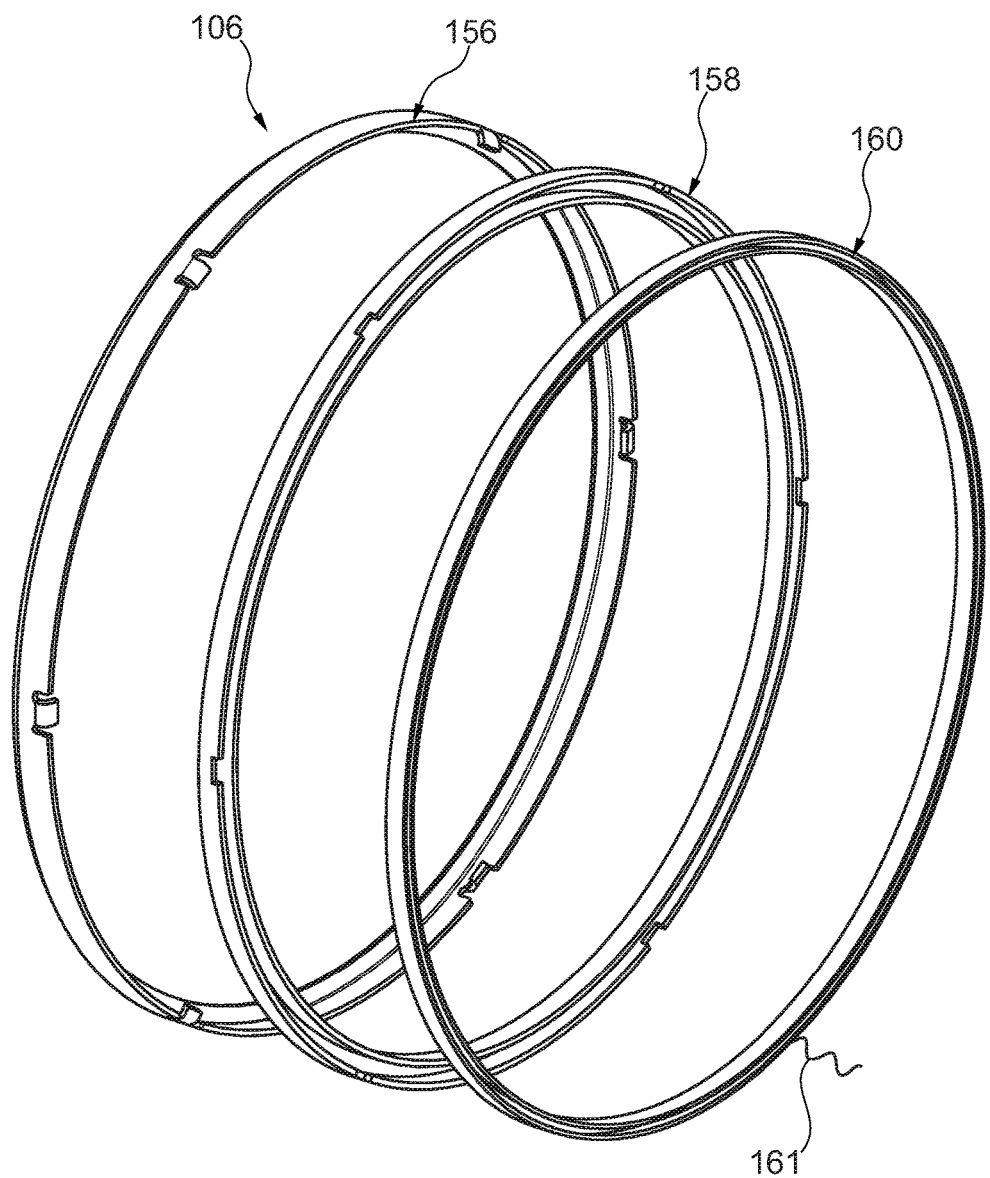
FIG. 8 is a back perspective exploded view of an electromagnet assembly of the clutch of FIG. 1.
Figure 9:
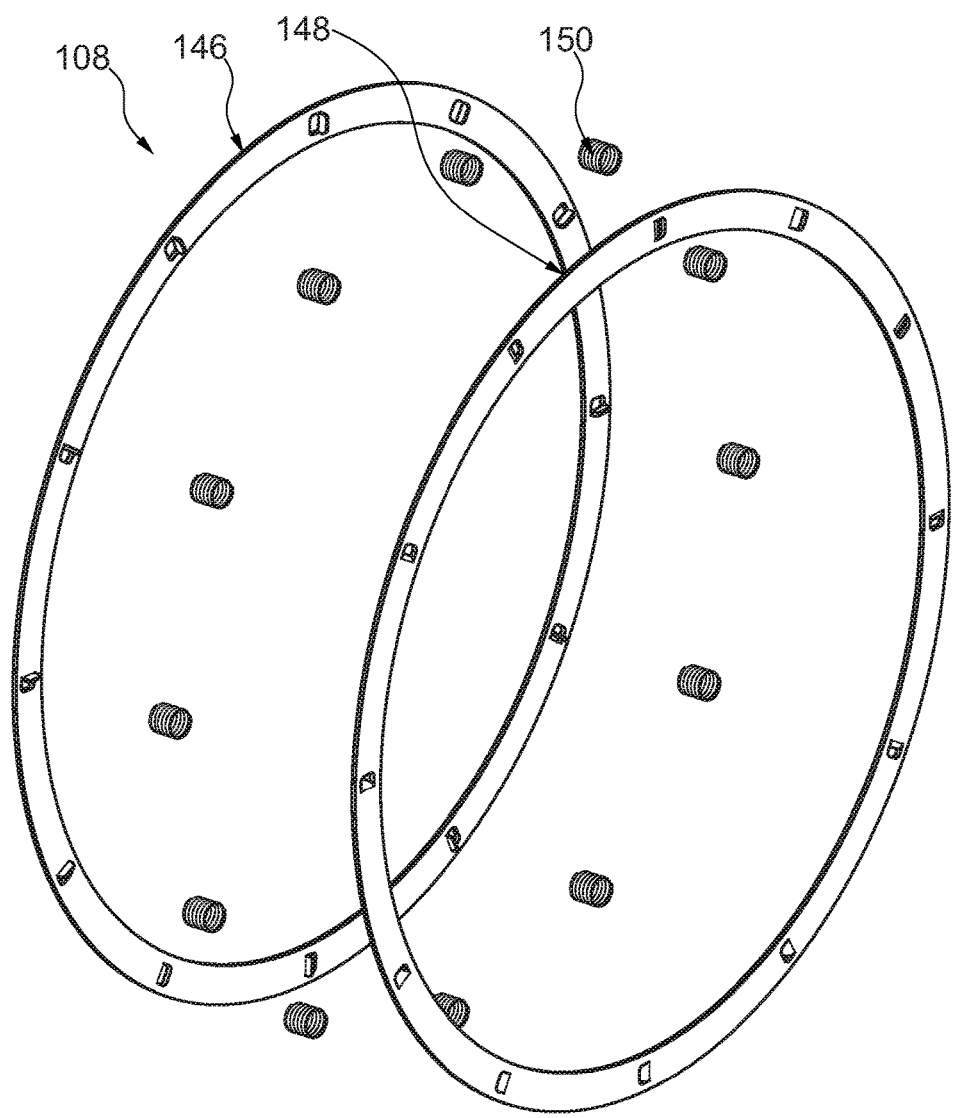
FIG. 9 is a front perspective exploded view of a coil spring assembly of the clutch of
FIG. 1.

The following description is made with reference to FIGS. 1-7. FIG. 1 is a front perspective view of switchable one-way clutch 100. FIG. 2 is a back perspective view of switchable one-way clutch 100. FIG. 3 is a partial cross-section view of switchable one-way clutch 100 taken generally along line 3-3 in FIG. 1. FIG. 4 is a front perspective exploded view of switchable one-way clutch 100. FIG. 5 is a back perspective exploded view of cage and roller assembly 102. FIG. 6 is a back detail view of a roller and arc spring of clutch 100 with some components removed for clarity. FIG. 7 is a front perspective exploded view of drag plate assembly 104. FIG. 8 is a back perspective exploded view of electromagnet assembly 106. FIG. 9 is a front perspective exploded view of coil spring assembly 108.

Switchable clutch 100 includes outer ring, or outer race, 110 with ramped surfaces 112, inner ring, or inner race, 114, roller cage 116, rollers 118, and drag plate, or friction plate, 120. Cage 116 is disposed radially between the outer ring and the inner ring. Ramped surfaces 112 may be also be referred to as a ramp profile and include a number of valley shaped ramps that allow the clutch to lock in one or both directions as described below. Rollers 118 are guided by the roller cage. That is, cage 116 has pockets 122 for receiving rollers 118. Biasing springs 124 are seated in groove 126 of the roller cage for positioning the rollers in the roller cage. Drag plate 120 is rotationally fixed to the inner ring and engageable with the roller cage to rotate the rollers relative to the outer ring.

Control plate 128 is rotationally fixed to the roller cage and contactable with the drag plate. That is, control plate 128 has axial protrusions 130 and roller cage 116 has indentations 132 for receiving the control plate protrusions, rotationally fixing the two components together. Although clutch 100 depicts roller cage 116 and control plate 128 as separate components, other embodiments (not shown) may have a single component that combines the functions of the roller cage and control plate.

Spring 134 is engaged with the outer ring and the control plate for urging the roller cage in direction 135 relative to the outer ring. That is, the outer ring has a notch and the control plate has protrusions, or tabs, 136 for acting on either end of spring 134 to urge the rollers into contact with the outer race ramped surfaces, realizing a one-way clutch function as is known in the art. That is, rotating the inner race in direction 135 urges rollers 118 up ramps 112 to lock the inner race with respect to rotation relative to the outer race. Spring 134 may be an arcuate spring, for example.

Inner ring 114 includes axial protrusions 138 and drag plate 120 includes apertures 140 for receiving the inner ring axial protrusions, rotationally fixing the two components together. Electromagnet 106 is for engaging the drag plate and the roller cage. That is, when energized, electromagnet 106 pulls the drag plate in direction 142 (FIG. 3) to contact the control plate. Drag plate assembly 104 may include friction material ring 144 for enhancing a friction coefficient between the drag plate and the control plate. Because the drag plate is rotationally fixed relative to the inner ring, the control plate and roller cage become frictionally engaged with the inner ring, rotating the rollers relative to the outer ring so clutch 100 locks in direction 135 and opposite direction 145.

Coil spring assembly 108 is for disengaging the drag plate and the roller cage. Coil spring assembly includes retainers 146 and 148, and springs 150. Assembly 108 is compressed in direction 142 when drag plate assembly 104 is pulled towards electromagnet 106 when energized, and urges the drag plate away from control plate 128 (direction 152) when the electromagnet is not energized. Snap ring, or retaining ring, 154, is installed in groove 155 of the inner ring and retains the drag plate and coil spring assembly within the inner ring.

Electromagnet 106 includes retainer 156, magnet pole 158, and coil 160. Retainer 156 may be made of a non-magnetic material (i.e., aluminum or stainless steel) to direct magnetic flux across magnet pole 158. Outer ring 110 includes protrusions 162 for installation in a transmission case (not shown), for example. That is, protrusions 162 prevent the outer ring for rotating within a stationary transmission case. Inner ring 114 includes spline portion 164 for connection with a shaft, clutch, or planetary gear of a transmission. Outer ring 110 includes circumferential surface 166 and inner ring 114 includes circumferential surface 168 centered on outer ring circumferential surface 166. Outer ring 110 includes annular surface 170 that may serve as a backing plate for a transmission clutch pack (not shown). Outer surface 172 of inner ring 114 may be a circumferential surface as is typical for roller clutches known in the art.

For a first mode of switchable clutch 100 (i.e., electromagnet not energized), the outer ring and the inner ring are rotationally locked only in a first rotational direction (i.e., direction 135). For a second mode of the switchable clutch (i.e., electromagnet energized via lead 161), the outer ring and the inner ring are rotationally locked in the first rotational direction and a second rotational direction, opposite the first rotational direction (i.e., direction 145). In other words, the electromagnet engages the second mode of the switchable clutch. Drag plate 104 rotates roller cage 116 with inner ring 114 as described above in the second mode of the switchable clutch.

Figure 10:
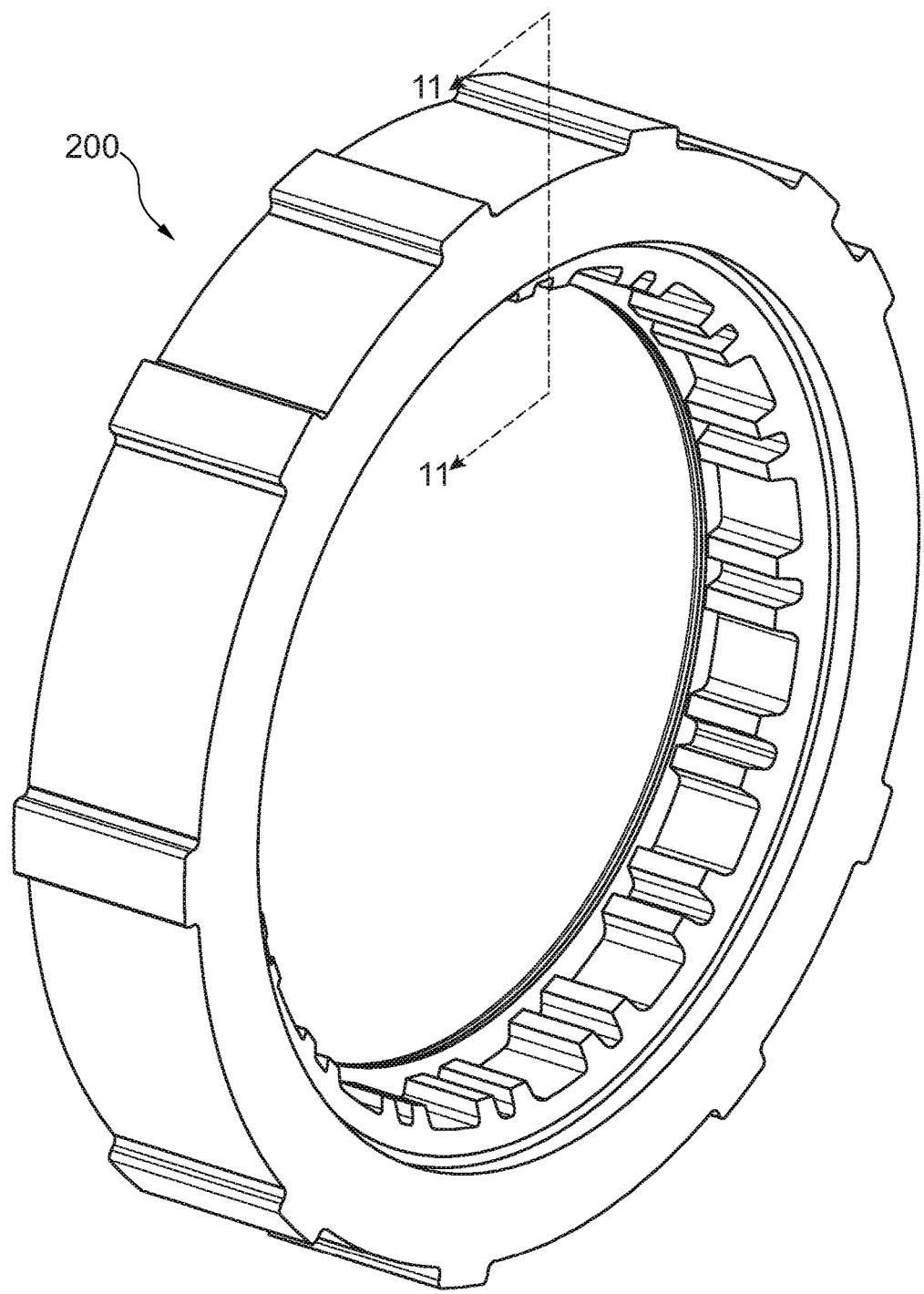
FIG. 10 is a front perspective view of an alternative embodiment of a switchable one-way clutch according to an example aspect.
Figure 11:
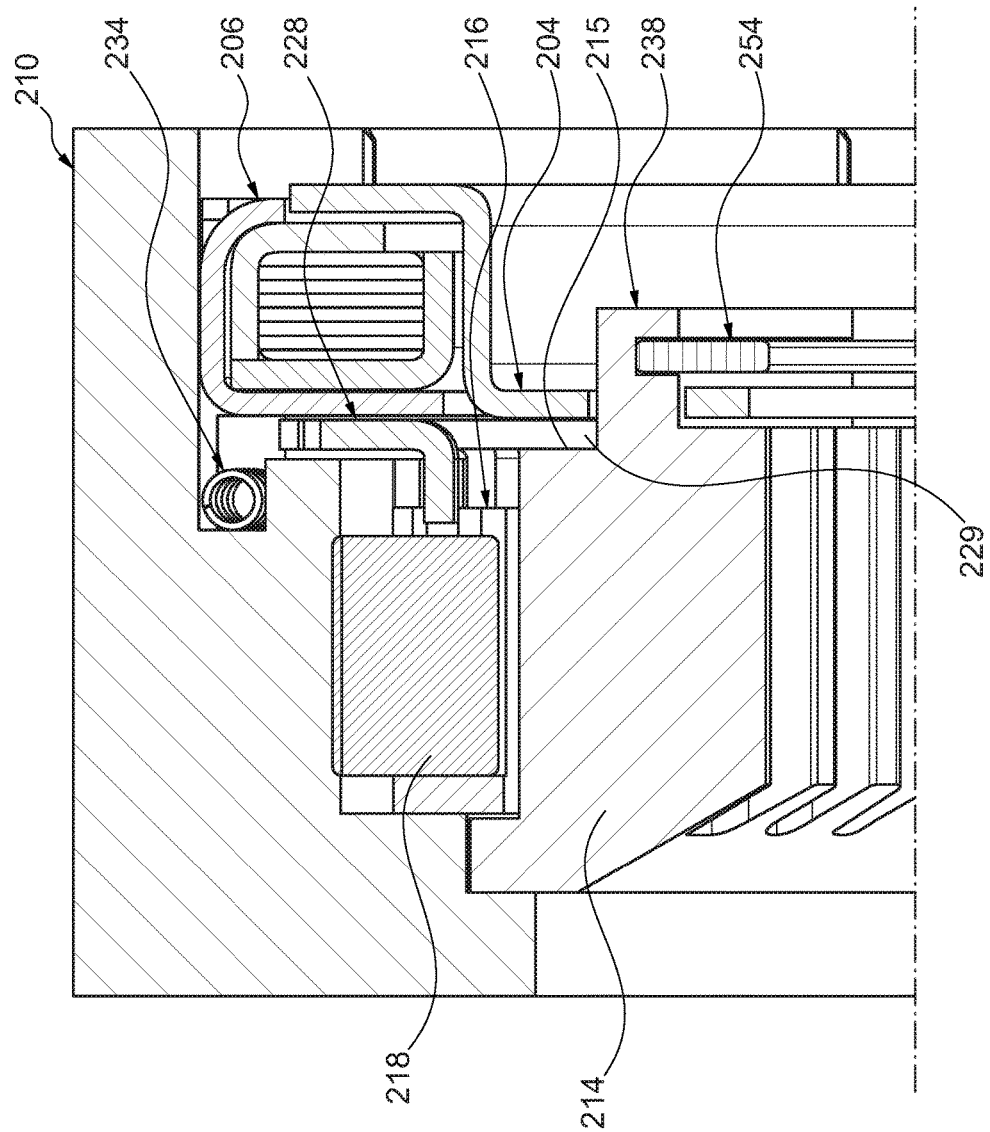
FIG. 11 is a partial cross-section view of the switchable one-way clutch of FIG. 10 taken generally along line 11-11 in FIG. 10.
Figure 12:
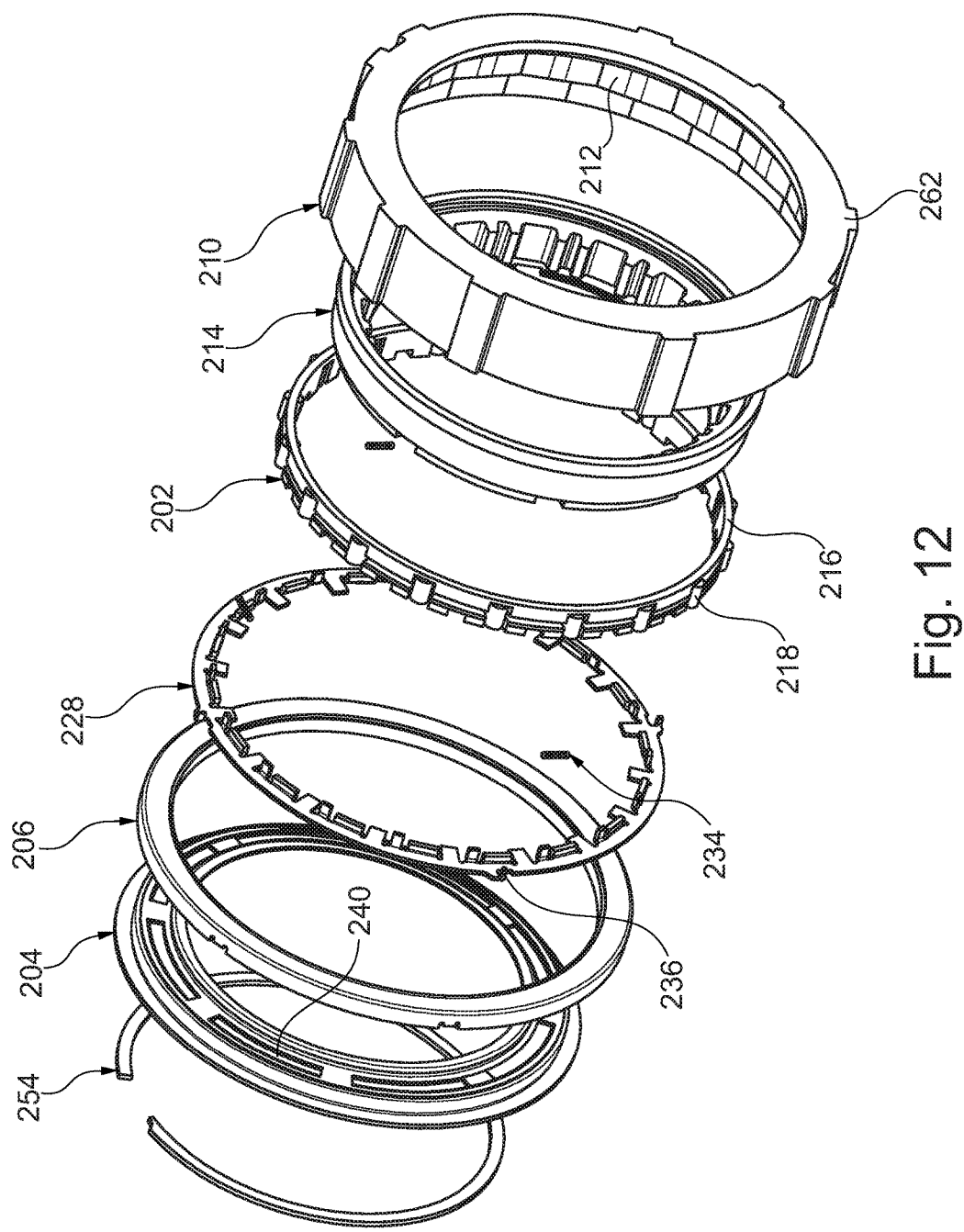
FIG. 12 is a front perspective exploded view of the switchable one-way clutch of FIG. 10.
Figure 13:
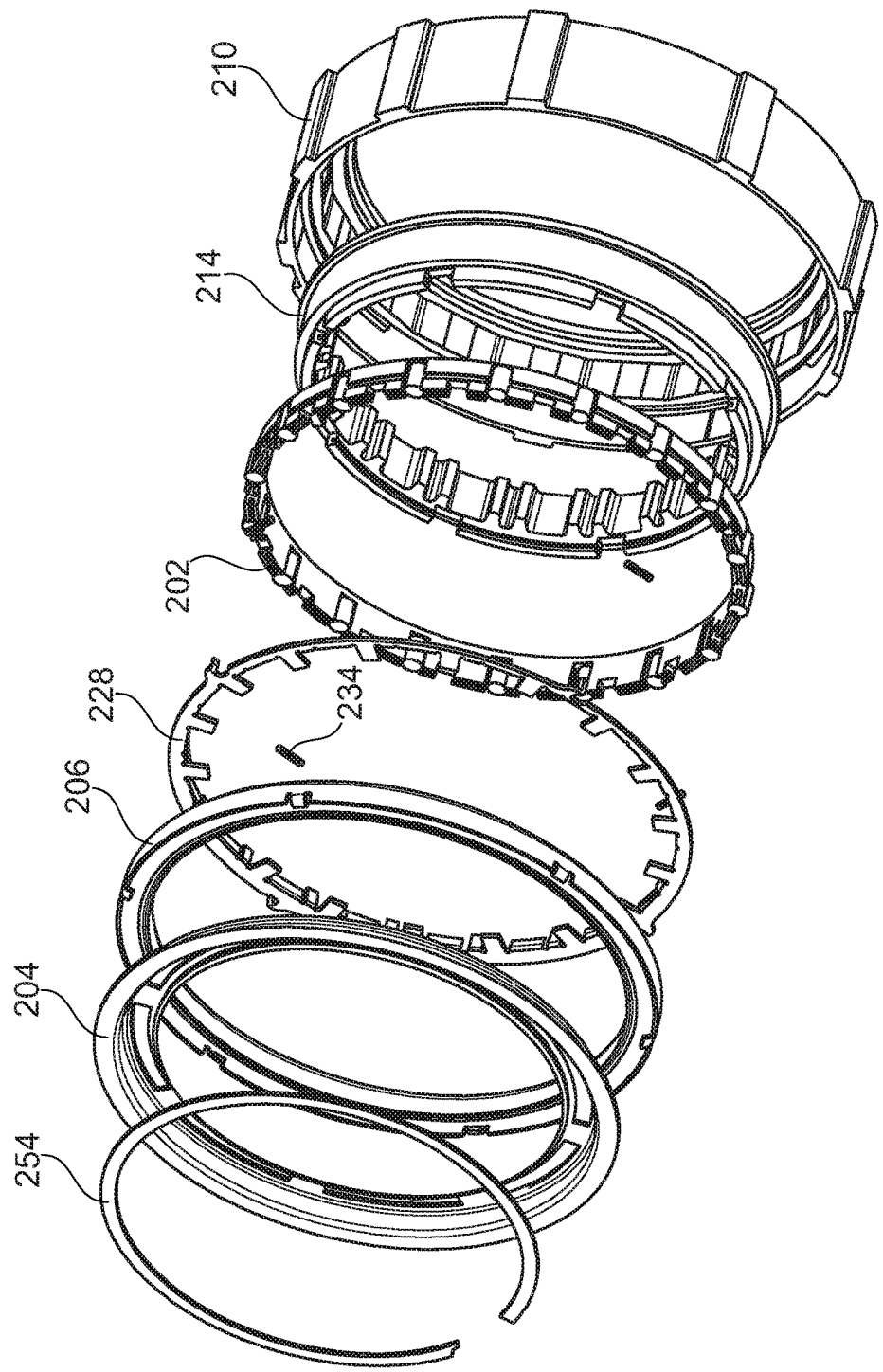
FIG. 13 is a back perspective exploded view of the switchable one-way clutch of FIG. 10.
Figure 14:
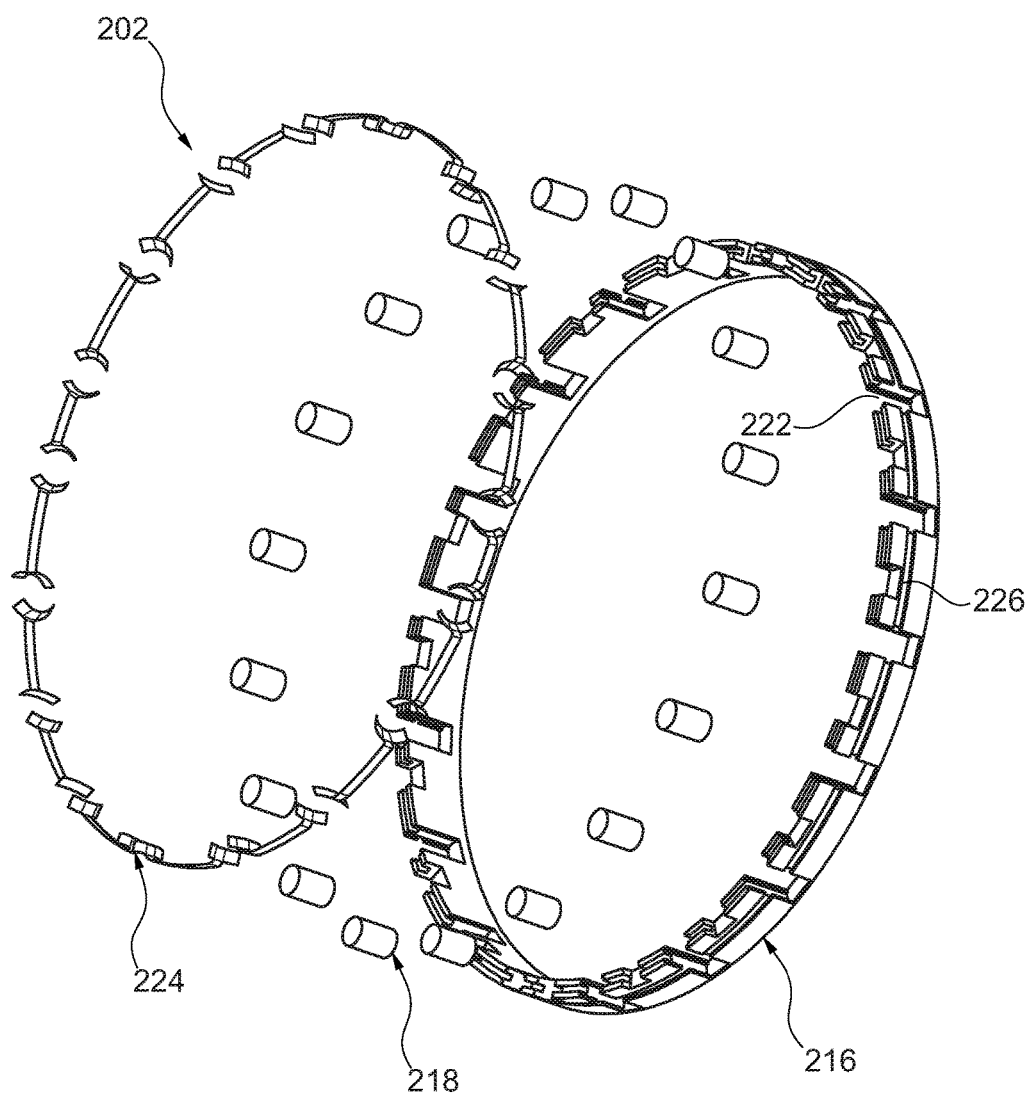
FIG. 14 is a back perspective exploded view of a cage and roller assembly of the clutch of FIG. 10.
Figure 15:
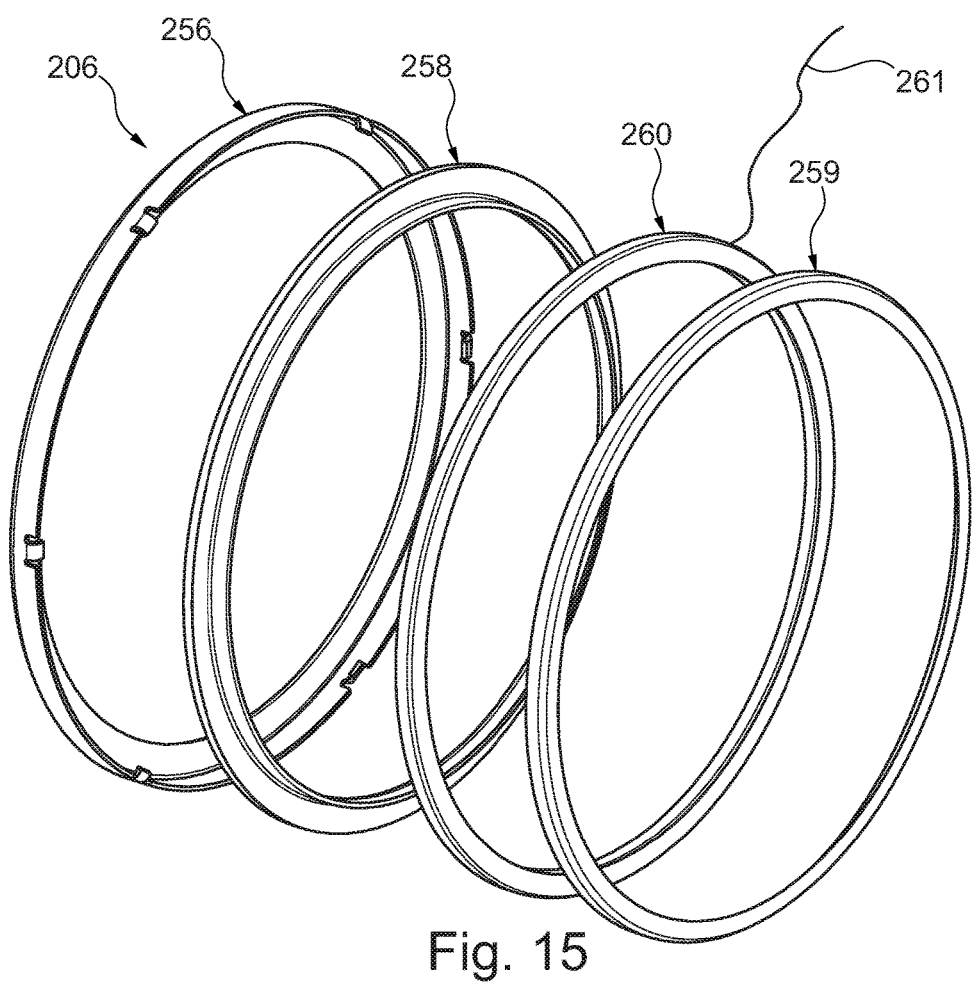
FIG. 15 is a back perspective exploded view of an electromagnet assembly of the clutch of FIG. 10.

The following description is made with reference to FIGS. 10-15. FIG. 10 is a front perspective view of switchable one-way clutch 200. FIG. 11 is a partial cross-section view of switchable one-way clutch 200 taken generally along line 11-11 in FIG. 10. FIG. 12 is a front perspective exploded view of switchable one-way clutch 200. FIG. 13 is a back perspective exploded view of switchable one-way clutch 200. FIG. 14 is a back perspective exploded view of cage and roller assembly 202. FIG. 15 is a back perspective exploded view of electromagnet assembly 206.

Clutch 200 is similar to clutch 100 and operates in a same manner except as described below. The description for 1XX reference numerals above generally applies 2XX reference numerals except as described below. Control plate 228 includes radial extensions 229 positioned between drag plate 204 and inner ring 214. When electromagnet 206 is energized, drag plate 204 clamps the control plate extensions against inner ring surface 215. As in clutch 100 above, the drag plate includes apertures for receiving inner ring protrusions so the two components are rotationally fixed, doubling the friction surfaces acting on the control plate and reducing the energy required to rotate the roller cage for the second mode. Electromagnet 206 includes nonmagnetic retainer 256, two-piece magnetic pole assembly 258 and 259, and coil 260. It should also be noted that clutch 200 does not include a component similar to coil spring assembly 108 in clutch 100.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A switchable clutch comprising:
   an outer ring including a plurality of ramped surfaces;
   an inner ring;
   a roller cage disposed radially between the outer ring and the inner ring;
   a plurality of rollers guided by the roller cage; and
   a drag plate rotationally fixed to the inner ring and engageable with the roller cage to rotate the rollers relative to the outer ring.

2. The switchable clutch of claim 1 further comprising a spring engaged with the outer ring for urging the roller cage in a first rotational direction relative to the outer ring.

3. The switchable clutch of claim 1 further comprising an electromagnet for engaging the drag plate and the roller cage.

4. The switchable clutch of claim 1 further comprising a coil spring assembly for disengaging the drag plate and the roller cage.

5. The switchable clutch of claim 1 wherein the drag plate includes a friction material ring for engaging with the roller cage.

6. The switchable clutch of claim 1 wherein the inner ring includes axial protrusions and the drag plate includes apertures for receiving the inner ring axial protrusions.

7. The switchable clutch of claim 1 further comprising a control plate rotationally fixed to the roller cage and contactable with the drag plate.

8. The switchable clutch of claim 7 further comprising a spring engaged with the outer ring and the control plate for urging the roller cage in a first rotational direction relative to the outer ring.

9. The switchable clutch of claim 1 further comprising biasing springs for positioning the rollers in the roller cage.

10. A switchable clutch comprising:
an outer ring;
an inner ring;
a plurality of rollers wherein:
for a first mode of the switchable clutch, the outer ring and the inner ring are rotationally locked only in a first rotational direction; and
for a second mode of the switchable clutch, the outer ring and the inner ring are rotationally locked in the first rotational direction and a second rotational direction, opposite the first rotational direction;
a roller cage for positioning the plurality of rollers;
a control plate rotationally fixed relative to the roller cage; and
a drag plate rotationally fixed to the inner ring and engageable with the roller cage to rotate the rollers relative to the outer ring.

11. The switchable clutch of claim 10 further comprising an electromagnet for engaging the second mode of the switchable clutch.

* * * * *